R. CONNELL.
AUTOMATIC INFLATER FOR PNEUMATIC TIRES.
APPLICATION FILED JAN. 19, 1910.
1,091,040.
Patented Mar. 24, 1914.
2 SHEETS—SHEET 1.
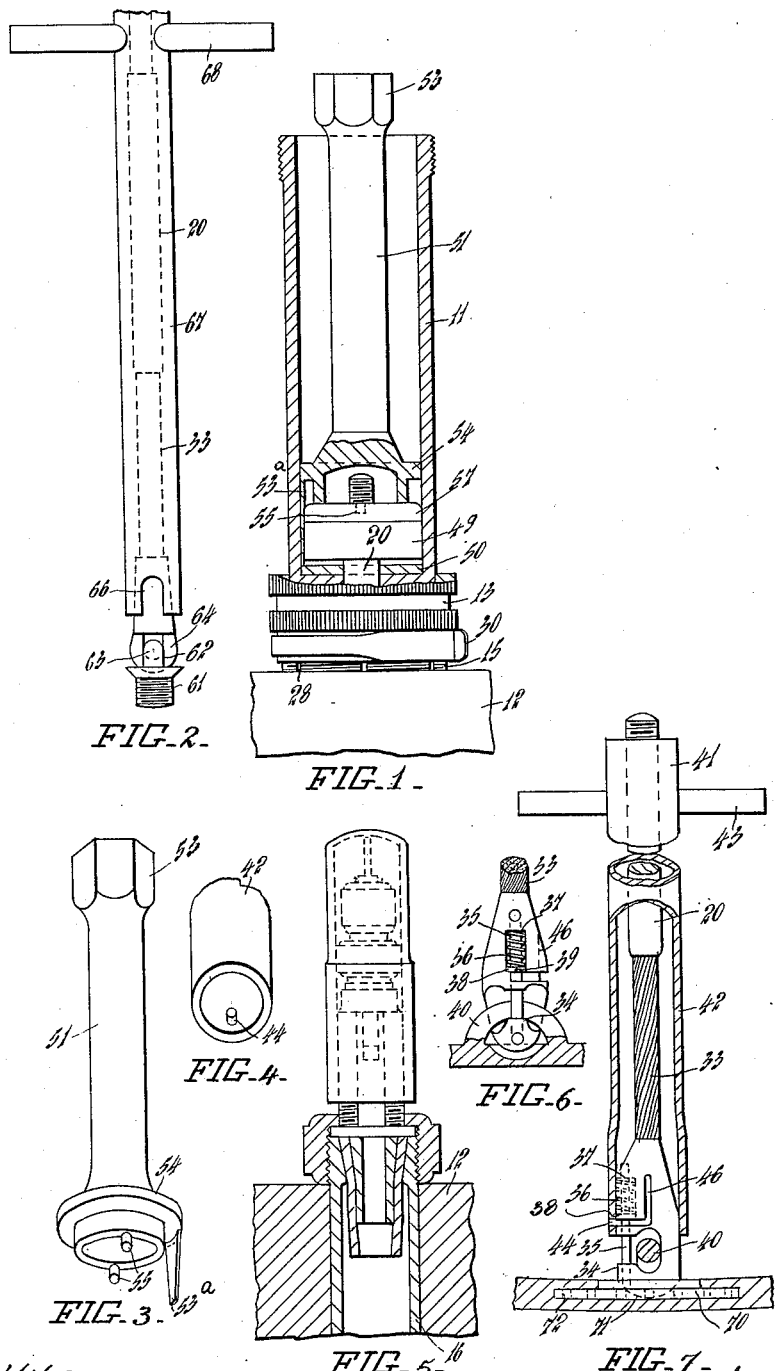

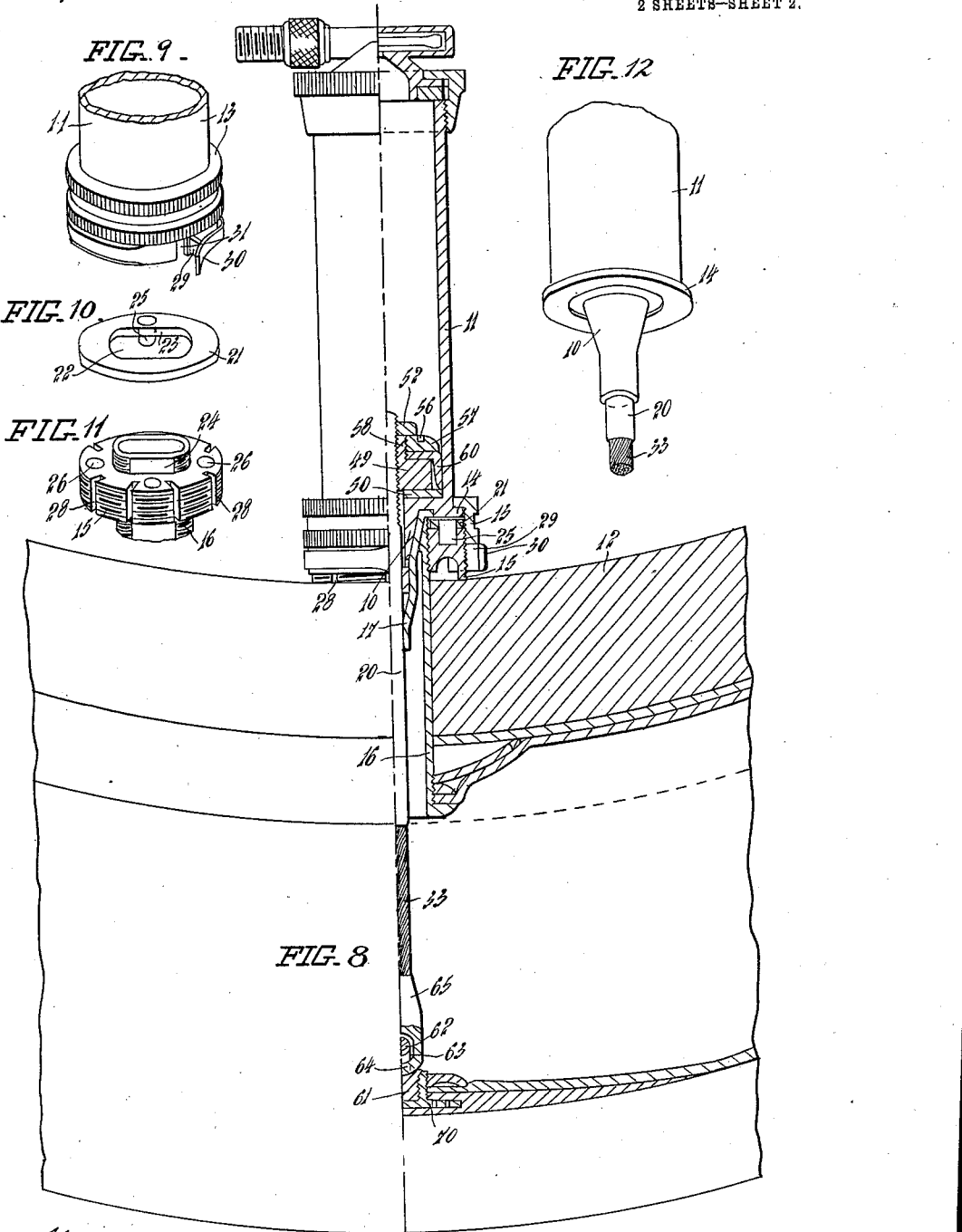

UNITED STATES PATENT OFFICE.

ROGER CONNELL, OF CHRISTCHURCH, NEW ZEALAND.

AUTOMATIC INFLATER FOR PNEUMATIC TIRES.

1,091,040.

Specification of Letters Patent. Patented Mar. 24, 1914.

Application filed January 19, 1910. Serial No. 538,944.

*To all whom it may concern:*

Be it known that I, ROGER CONNELL, a citizen of the Dominion of New Zealand, and residing at 50 Leinster road, Christchurch, in the Provincial District of Canterbury, in the Dominion of New Zealand, have invented certain new and useful Improvements in Automatic Inflaters for Pneumatic Tires, of which the following is a specification.

This invention relates to that class of air pumps which are attached to the rim of a wheel for the purpose of maintaining the air within a pneumatic tire at constant pressure during the rotation of the wheel upon which the tire is mounted, and wherein the compression by contact with the ground of that part of the tire to which the piston rod of the pump is attached actuates the pump and forces air into the tire at each revolution of the wheel.

My invention provides improvements in inflating apparatus of the kind above referred to, and whereby the cost of construction is reduced and the efficiency of the apparatus increased; and according hereto the piston rod is made of flexible material at its lower part, such as wire cord; improved means are provided for readily attaching and detaching the piston rod from the tire, and for adjusting the piston upon its rod, for attaching the pump to the rim, and for preventing the return of air from the tire into the pump.

The accompanying drawing illustrates the invention, and will now be referred to for the purposes of a detailed description.

Figure 1 is a part sectional elevation of a pump constructed in accordance with the invention, Fig. 2 an elevation of a spanner on a piston rod, Fig. 3 a perspective elevation of a spanner, Fig. 4 an end view of a spanner, Fig. 5 a part sectional elevation of a valve, Fig. 6 an elevation of a fastening for a piston rod end, Fig. 7 an elevation of a piston rod and a spanner in position thereon, Fig. 8 a part sectional elevation of inflating apparatus as applied to a motor car wheel, Fig. 9 a perspective view of a union, Fig. 10 a perspective view of a washer, Fig. 11 a perspective view of a nut, and Fig. 12 a perspective view of the bottom of a pump.

Referring now more particularly to Fig. 8, which shows the invention applied to the wheel of a motor car or the like, the pump 11 is attached to the rim 12 of a wheel by a union 13 engaging a shoulder 14 upon the pump and screwing upon a circular nut 15 which has a screw thread around its periphery and is screwed upon the barrel 16 of an ordinary tire valve. The end of the pump is made with a conical stem 10 and the end of the barrel 16 is made conical to correspond with the stem. A rubber sleeve 17 makes an airtight joint between the stem 10 and the barrel 16, and extending beyond the stem fits closely around the piston rod 20 and prevents air from returning to the pump from the tire, but allows air to pass freely from the pump to the tire.

The nut 15 is adjustable upon the barrel 16 to suit rims of different thicknesses and is locked in position by a washer 21, see Fig. 10, which has a hole 22 made with flat sides 23 to fit corresponding flat sides 24 formed upon the barrel 16. A pin 25 projecting from the face of the washer 21 is adapted to fit in any of the holes 26 formed in the nut 15, which is tightened up until the pin will fall into one of the said holes. Grooves 28 cut in the periphery of the nut 15 are adapted to be engaged by a spanner or other tool for screwing up the nut. These said grooves are adapted to be engaged by the lug 29 of a spring catch 30 fixed upon the outside of the union 13. The lug passes through a slot 31 in the union and engaging with any one of the grooves 28 effectually locks the union and nut together.

The piston rod 20 has its lower part 33 made of wire cord and is thus flexible enough not to interfere with slight lateral movements of the tire relative to the rim. The lower end of the piston rod is formed with a jaw 34, see Figs. 6 and 7, normally closed by a sliding bolt 35 operated by a spring 36 in compression between a shoulder 37 and a washer 38 secured upon the bolt by a rivet 39.

For the purpose of detaching the piston rod from the eyelet 40 a spanner 41, see Figs. 3 and 7, is employed and consists of a tube 42 having a handle 43 at one end and an internally projecting pin 44 near its other end. To withdraw the bolt 35, the piston and pump are removed and the spanner passed over the piston rod 20 and through the barrel 16. The spanner is turned around until the pin 44 enters a vertical groove 46 formed in the end of the piston rod, and by pushing the spanner downward until the said pin enters the horizontal part of the said groove. The spanner is turned around until the pin is below the washer 38 which may then be raised and the bolt withdrawn by pulling upon the handle 43. The jaw 34 can then be readily removed from the eyelet 40.

The piston 49 is screwed upon the piston rod 20 and is adjustable thereon for the purpose of properly positioning the piston with regard to the particular tire to which the invention is to be applied. That is the piston is so adjusted on the piston rod that it will be at the bottom of the pump cylinder when the tread portion of the tire connected therewith is in its outermost position. A washer 50 is placed upon the bottom of the pump to soften the blow of the piston at the termination of its stroke. As the piston 49 while attached to the piston rod, as shown in Fig. 8, cannot be withdrawn from the pump, a special spanner 51, see Fig. 3, is employed for unscrewing the piston and its lock nut 52. The spanner is tubular and has one end 53 shaped to fit the nut 52. The other end of the spanner has a thin blade 53ª integral with a collar 54, the diameter of which corresponds approximately with the diameter of the pump. Two pins 55 projecting from the end of the spanner are adapted to fit holes 56 formed in a nut 57 screwed upon a stem 58 of the piston. The spanner is shown in operative position in Fig. 1, the nut 52 having previously been removed by employing the end 53 of the spanner. The nut 57 is made to screw tightly on the stem 58, and the piston is made to screw comparatively loosely upon the piston rod. The introduction of the blade 53ª between the cupped leather washer 60 of the piston and the side of the pump allows air to escape from the tire and thus relieve the pressure prior to removal of the piston, which is effected by turning the spanner while the pins 55 are in engagement with the holes 56 in the nut 57.

Figs. 2 and 8 show a modification in the construction of means for connecting the piston rod to the tire which comprises a screw 61 having an eyelet 62 formed by bending over an integral wire 63 after it has been passed through another eyelet 64 fixed upon the end of the piston rod. The eyelet 62 is adapted to be engaged by notches 66 formed in the end of a tubular spanner 67 operable by a handle 68. The screw 61 is readily removed by turning the spanner 67 when adjusted upon the eyelet 62. In Fig. 2 the spanner is shown upon the piston just prior to being brought into engagement with the eyelet 62.

The jaw 34 is made with a hemispherical end and the base plate 70 of the eyelet 40, see Figs. 6 and 7 is made with a correspondingly shaped recess 71, so that the jaw and recess form together a joint which operates similar to a ball and socket joint. The plate 70 is also formed with holes 72, wherein rubber solution enters, when the parts are secured together, for the purpose of assisting in holding the eyelet in position.

The operation of the invention, briefly described, is as follows: As the wheel rotates and the section of the tread of the tire which is connected with the piston comes in contact with the ground any considerable inward movement of such tread portion will cause a corresponding upward movement of the piston. Such inward movement of a portion of the tire acts to compress more or less the body of air within the tire and when, by the turning of the wheel, the tread portion connected with the piston passes from contact with the ground the pressure exerted by the air in the tire moves it outward and thereby draws into the tire the charge of air contained between the piston and tire. The flexible valve 17 effectually prevents air escaping from the tire to the pump while permitting it to freely pass in the opposite direction. The length of movement of the piston will depend upon the extent to which the portion of the tire connected therewith is moved inward as it contacts with the ground, and this in turn depends upon the amount or degree of inflation of the tire. When the tire is inflated to approximately the maximum extent the very slight inward movements of the tread adjacent the piston rod will not affect such rod at all because of the loose connection between the rod and tire provided by the hook and eye. As before noted also the piston rod is made slightly flexible laterally so that it will not be liable to be damaged by any side movement of the portion of the tire connected thereto.

What I do claim and desire to secure by Letters Patent of the United States is:—

1. In an inflater for pneumatic tires, a piston rod having its lower part made of flexible wire cord, substantially as set forth.

2. In an inflater for pneumatic tires, a pump having a shoulder, a valve casing, a circular nut screwed upon the valve casing, and provided with a screw thread in its periphery, a washer having a hole with flat sides fitting upon flat sides formed upon the valve casing, a pin projecting from the face of the washer, and fitting into holes formed in the nut, and a union fitting around the pump and engaging the shoulder thereof and screwed upon the circular nut, as set forth.

3. In an inflater for pneumatic tires, a pump having a shoulder, a valve casing, a circular nut screwed upon the valve casing and provided with a screw thread and grooves in its periphery, a washer having a hole with flat sides fitting upon flat sides formed upon the valve casing, a pin projecting from the face of the washer and fitting into holes formed in the nut, a union fitting around the pump and engaging the shoulder thereof and screwed upon the circular nut, and a spring catch upon the union and adapted to engage the grooves in the circular nut, as set forth.

4. In an inflater for pneumatic tires, a pump, piston and piston rod, a jaw upon the end of the piston rod, a spring operated bolt slidable across the jaw, a washer upon the bolt, there being a groove in the jaw leading downward and below the said washer, as set forth.

In testimony whereof I have signed my name to this specification in the presence of two witnesses.

ROGER CONNELL.

Witnesses:
J. J. WATSON,
R. F. SIMES.